(12) United States Patent
Carlson et al.

(10) Patent No.: US 10,572,846 B2
(45) Date of Patent: Feb. 25, 2020

(54) CROWD PLANNING TOOL

(71) Applicant: Walmart Apollo, LLC, Bentonville, AR (US)

(72) Inventors: Kurtis Dale Carlson, Bentonville, AR (US); Ryan Allen Maute, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 669 days.

(21) Appl. No.: 14/615,614

(22) Filed: Feb. 6, 2015

(65) Prior Publication Data

US 2015/0248629 A1 Sep. 3, 2015

Related U.S. Application Data

(60) Provisional application No. 62/031,344, filed on Jul. 31, 2014, provisional application No. 61/946,171, filed on Feb. 28, 2014.

(51) Int. Cl.
*G06Q 10/00* (2012.01)
*G06Q 10/06* (2012.01)
(Continued)

(52) U.S. Cl.
CPC ..... *G06Q 10/06315* (2013.01); *G06F 3/0482* (2013.01); *G06F 3/04842* (2013.01);
(Continued)

(58) Field of Classification Search
CPC .............................................. G06Q 10/06315
(Continued)

(56) References Cited

U.S. PATENT DOCUMENTS 7,483,917 B2 * 1/2009 Sullivan .................. G06T 17/05
7,885,865 B2 * 2/2011 Benson .............. G06Q 10/0637
705/28

(Continued)

FOREIGN PATENT DOCUMENTS

EP         2662831 A2     11/2013

OTHER PUBLICATIONS

International Preliminary Report on Patentability in counterpart international application No. PCT/US15/14729, dated Sep. 15, 2016; 7 pages.

(Continued)

*Primary Examiner* — Matthew S Gart
*Assistant Examiner* — Tyrone E Singletary
(74) *Attorney, Agent, or Firm* — Schmeiser, Olsen & Watts LLP

(57) ABSTRACT

According to one aspect, embodiments of the invention provide a crowd management planning system, the system comprising a plurality of store servers configured to be coupled to a network, and a central server, the central server comprising an interface configured to be coupled to the network, a database, and a crowd planning module coupled to the interface and the database and configured to communicate with each one of the plurality of store servers, wherein the crowd planning module is further configured to provide a crowd planning tool to at least one of the plurality of store servers, receive crowd planning information from the at least one of the plurality of store servers based on users' interactions with the crowd planning tool, and store the received crowd planning information in the database.

20 Claims, 9 Drawing Sheets

(51) Int. Cl.
*G06F 16/955* (2019.01)
*G06F 3/0482* (2013.01)
*G06F 3/0484* (2013.01)
*H04L 29/08* (2006.01)

(52) U.S. Cl.
CPC ....... *G06F 16/955* (2019.01); *G06Q 10/0635* (2013.01); *G06Q 10/0637* (2013.01); *G06Q 10/06311* (2013.01); *H04L 67/10* (2013.01); *G06Q 10/06375* (2013.01)

(58) Field of Classification Search
USPC ........................................... 705/7.25
See application file for complete search history.

(56) References Cited

U.S. PATENT DOCUMENTS

| | | | |
|---|---|---|---|
| 8,812,344 B1* | 8/2014 | Saurabh | G06K 9/00778 705/7.29 |
| 2002/0168084 A1* | 11/2002 | Trajkovic | G06K 9/00778 382/100 |
| 2008/0294487 A1* | 11/2008 | Nasser | G06Q 30/02 705/7.32 |
| 2012/0010914 A1* | 1/2012 | Magerkurth | G06Q 10/063 705/7.11 |
| 2012/0063367 A1 | 3/2012 | Curtis et al. | |
| 2012/0066212 A1* | 3/2012 | Jennings | G06F 17/30144 707/723 |
| 2012/0066231 A1 | 3/2012 | Peterson et al. | |
| 2013/0006790 A1* | 1/2013 | Raskin | G06Q 10/04 705/26.1 |
| 2013/0262174 A1* | 10/2013 | Singh | G06Q 10/06 705/7.25 |

OTHER PUBLICATIONS

International Search Report & Written Opinion in counterpart international application No. PCT/US15/14729, dated Apr. 16, 2015; 9 pages.

* cited by examiner

CROWD PLANNING TOOL

CROSS-REFERENCE TO RELATED APPLICATIONS

This application claims priority to U.S. Provisional Patent Application No. 61/946,171 filed Feb. 28, 2014, entitled CROWD PLANNING TOOL and to U.S. Provisional Application No. 62/031,344 filed Jul. 31, 2014, entitled CROWD PLANNING TOOL, both of which are herein incorporated by reference in its entirety for all purposes.

BACKGROUND OF THE DISCLOSURE

Field of the Invention

Aspects of the present invention relate to a system and method for crowd management.

Discussion of Related Art

Crowd management is the controlling of a crowd (i.e., a group of people) in a location to prevent disorder, confusion, inefficiency, and/or unsafe conditions amongst the crowd. Devices such as stanchions, barriers, fences, decals, signs, ropes, retractable belts, etc. are commonly used in crowd management to direct a crowd, or portions of a crowd, in desired directions. Retailers are often concerned with crowd management as a large unmanaged crowd at a retail location can lead to confusion, panic, angry customers, or unsafe conditions.

SUMMARY

As discussed above, retailers are often concerned with crowd management as a large unmanaged crowd at a retail location can lead to disorderly and unsafe conditions. For example, a retailer may desire to implement a detailed crowd management plan at a retail store during a period of increased activity in the retail store. Such periods of increased activity in a retail store may include holiday periods, sale periods, a special event, an evacuation of the retail store, a fire alarm within the store, or any other period of time in which activity in the retail store is increased or enhanced beyond a typical level. These different periods of increased activity may require different crowd management plans as the desired flow of people in each situation may be different.

Accordingly, embodiments described herein provide a system and method for generating, editing, and/or managing crowd management plans. The system and method allows a retailer to generate, edit, and manage multiple crowd management plans for any number of different periods of increased activity within a retail store. The system and method may also allow the retailer to pass any generated crowd management plans to a central location for approval. Additionally, the system and method may allow for the transformation of any generated crowd management plans into web-based maps which are more appropriate for viewing by a consumer. By utilizing such a system and method, as described below, a retailer may be more easily, and more broadly, prepared for any number of different periods of increased activity. Not only may such preparation prevent any undesired confusion and/or unsafe conditions, but it may also help the retailer comply with any regulations related to crowd management by a retailer.

One aspect of the present invention is directed to a crowd management planning system, the system comprising a plurality of store servers configured to be coupled to a network, and a central server, the central server comprising an interface configured to be coupled to the network, a database, and a crowd planning module coupled to the interface and the database and configured to communicate with each one of the plurality of store servers, wherein the crowd planning module is further configured to provide a crowd planning tool to at least one of the plurality of store servers, receive crowd planning information from the at least one of the plurality of store servers based on users' interactions with the crowd planning tool, and store the received crowd planning information in the database.

According to one embodiment, the crowd management planning system further comprises a store interface coupled to the at least one of the plurality of store servers, and the crowd planning tool provided to the at least one of the plurality of store servers includes a Graphical User Interface (GUI) displayed on the store interface. In one embodiment, the crowd planning tool is further configured to provide at least one store layout map to the GUI displayed on the store interface. In another embodiment, the at least one store layout map is one of a new store layout map and a previously generated crowd planning map stored in the database. In one embodiment, the crowd planning information received by the crowd planning module includes crowd planning information associated with the at least one store layout map and input by a user through interactions with the GUI displayed on the store interface. In another embodiment, the crowd planning information associated with the at least one store layout map includes at least one of a crowd problem area and a crowd management device.

According to another embodiment, the crowd planning module is further configured to generate a department level map based on the crowd planning information associated with the at least one store layout map. In one embodiment, the crowd management planning system further comprises at least one approval center, and the crowd planning module is further configured to transmit the crowd planning information associated with the at least one store layout map to the at least one approval center, and receive an approval decision related to the crowd planning information associated with the at least one store layout map from the at least one approval center.

According to one embodiment, the crowd planning module is further configured to transmit the crowd planning information associated with the at least one store layout map to a transformation module, and to receive, from the transformation module, a consumer map generated by the transformation module based on the crowd planning information associated with the at least one store layout map.

Another aspect of the present invention is directed to a method for managing crowd planning information from a plurality of stores in a retail environment, the method comprising providing, from a crowd planning module in a central server, a crowd planning tool to at least one store server in at least one of the plurality of stores in the retail environment, displaying, at an interface in the at least one of the plurality of stores, the crowd planning tool to a user, receiving, at the crowd planning module, crowd planning information from the at least one store server based on user interaction with the crowd planning tool, and storing the crowd planning information in a database of the central server.

According to one embodiment, displaying the crowd planning tool includes displaying at least one store layout map associated with the at least one of the plurality of stores. In one embodiment, displaying the at least one store layout map includes displaying at least one of a new store layout map and a previously generated crowd planning map stored in the database.

According to another embodiment, receiving crowd planning information includes receiving crowd planning information associated with the at least one store layout map and input by the user to the crowd planning tool. In one embodiment, receiving crowd planning information associated with the at least one store layout map includes receiving crowd planning information related to at least one of a crowd problem area and a crowd management device.

According to one embodiment, the method further comprises generating, with the crowd planning module, a department level map based on the crowd planning information associated with the at least one store layout map. In another embodiment, the method further comprises transmitting, by the crowd planning module, the crowd planning information associated with the at least one store layout map to at least one approval center, and receiving an approval decision from the at least one approval center. In one embodiment, the method further comprises transmitting, by the crowd planning module, the crowd planning information associated with the at least one store layout map to a transformation module, and receiving, by the crowd planning module from the transformation module, a consumer map generated by the transformation module based on the crowd planning information associated with the at least one store layout map.

At least one aspect of the present invention is directed to a non-transitory computer-readable medium encoded with instructions for execution on a distributed computer system within a retail environment, the instructions when executed, performing a method comprising acts of providing, from a crowd planning module in a central server, a crowd planning tool to at least one store server in at least one of a plurality of stores in the retail environment, displaying, at an interface in the at least one of the plurality of stores, the crowd planning tool to a user, receiving, at the crowd planning module, crowd planning information from the at least one store server based on user interaction with the crowd planning tool, and storing the crowd planning information in a database of the central server.

According to one embodiment, displaying the crowd planning tool includes displaying at least one store layout map associated with the at least one of the plurality of stores. In another embodiment, receiving crowd planning information includes receiving crowd planning information associated with the at least one store layout map and input by the user to the crowd planning tool.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Figure 1:
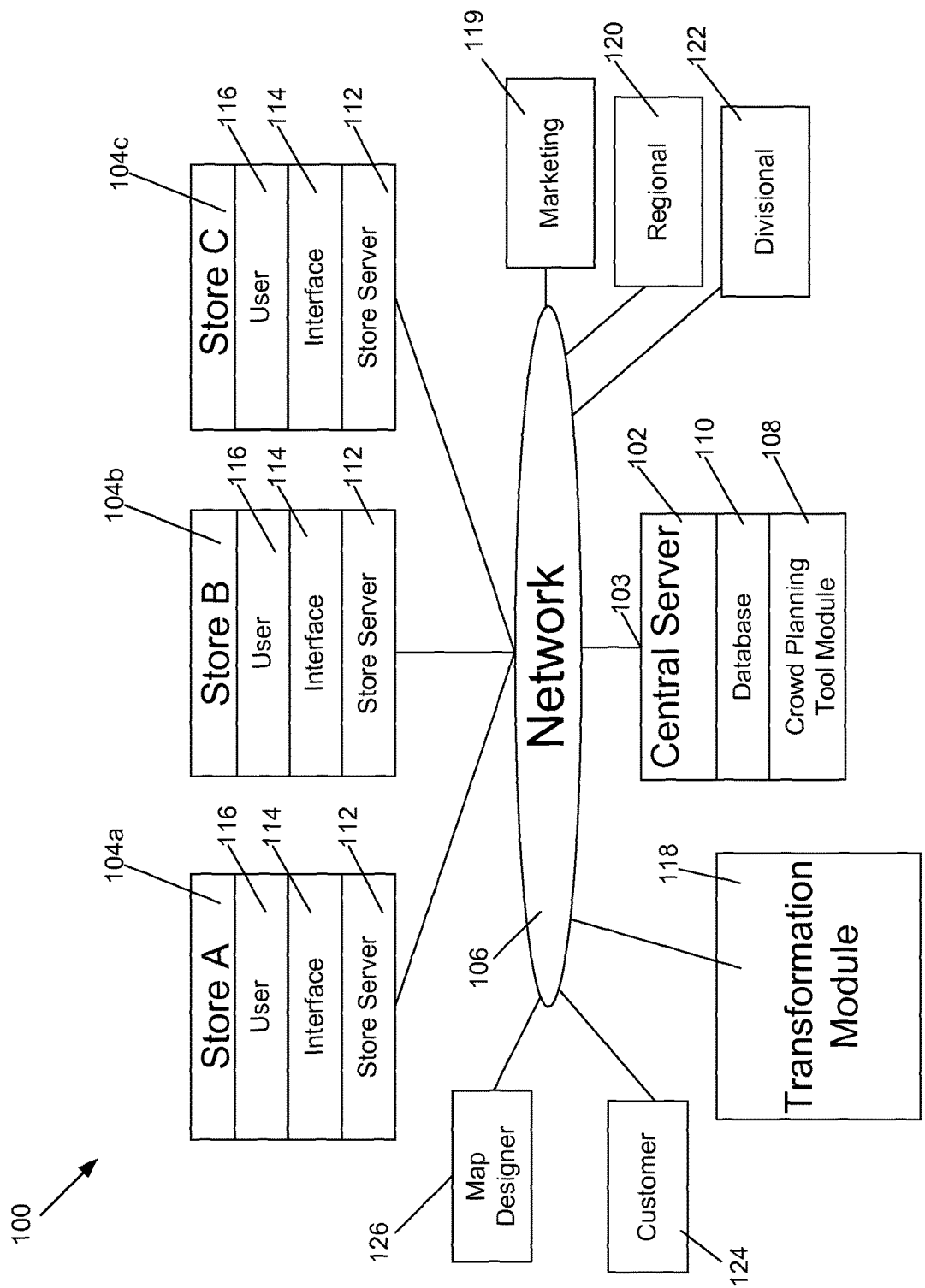
FIG. 1 is a block diagram illustrating one embodiment of a system for generating, editing, and/or managing crowd management plans for a group of retail stores in accordance with at least one embodiment described herein.

FIG. 1 is a block diagram illustrating one embodiment of a system 100 for generating, editing, and/or managing crowd management plans for a group of retail stores. The system 100 includes a central server 102, a group of retail stores 104(a-c), and a network 106. The central server 102 includes a crowd planning tool module 108 and a database 110. Each retail store 104(*a-c*) includes a store server 112 and an interface 114. According to some embodiments, the system 100 may also include a transformation module 118, a marketing center 119, a regional center 120, and/or a divisional center 122.

The central server 102 operates the crowd planning tool module 108 and allows each store 104(*a-c*) to interact with the crowd planning tool module 108 to create, edit, manage, etc. crowd management plans. The central server 102 stores any generated crowd management plans from each store 104(*a-c*), and any other associate information, in its database 110. The central server 102 communicates with the store server 112 of each store 104(*a-c*) via an interface 103 and a network 106. According to one embodiment, the network 106 is the Internet; however, in other embodiments, the network 106 may be some other type of Wide Area Network (WAN) or group of networks.

In each store 104(*a-c*), a user 116 associated with the store (e.g., a store manager or other authorized store associate) interacts with the crowd planning tool module 108 on the central server 102 via an interface 114, the store server 112, and the network 106. According to some embodiments, the interface 114 is a computer system, terminal, mobile device, tablet, or any other device configured to communicate with the store server 112 (and hence the central server 102 via the network 106). By interacting with the crowd planning tool module 108, the user 116 may create, edit, manage, etc. desired crowd management plans. Operation of the system 100 is discussed in greater detail with regard to FIG. 2.

Figure 2:
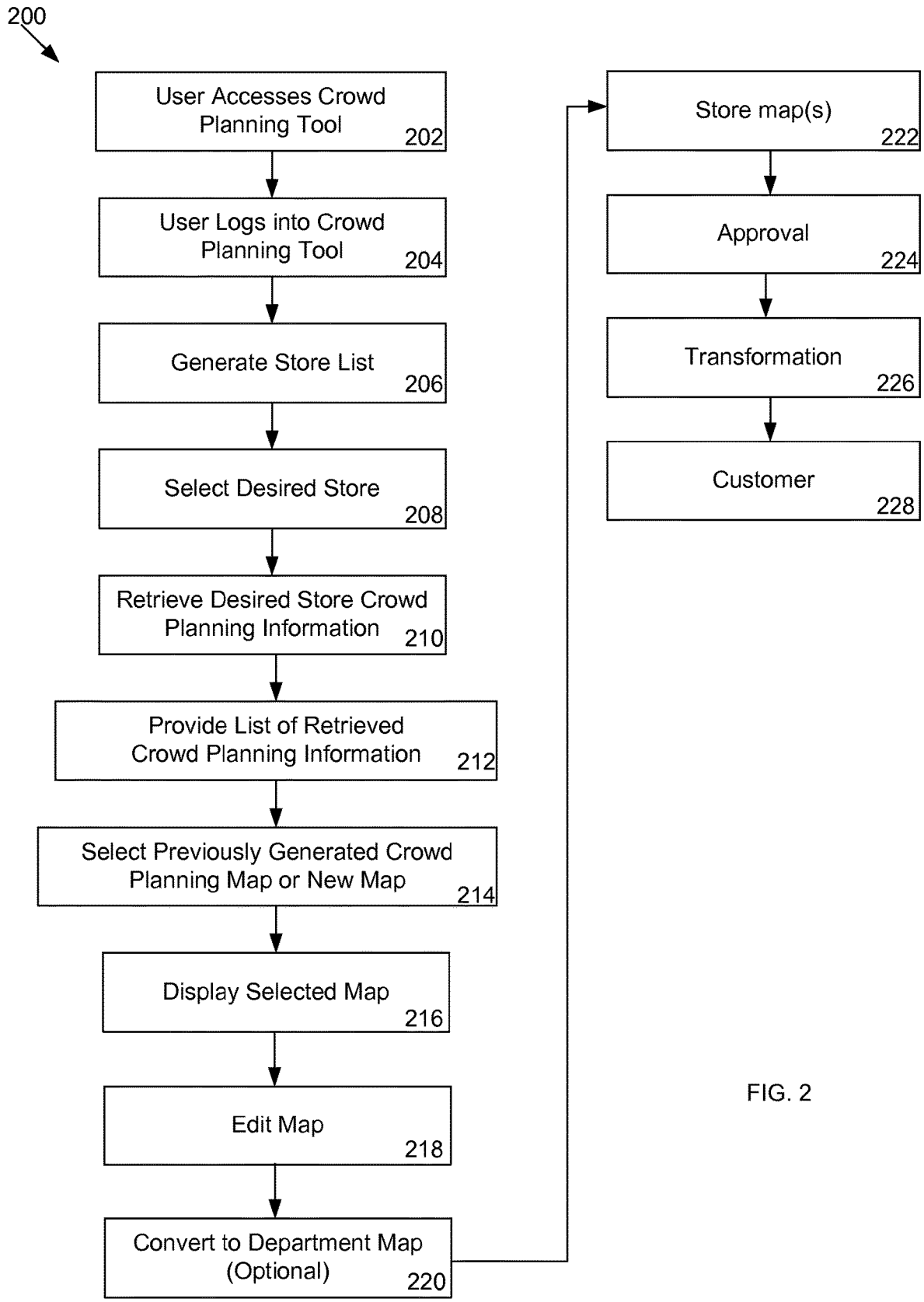
FIG. 2 is a flow chart illustrating a process for generating, editing, and/or managing crowd management plans of a retail store in accordance with at least one embodiment described herein.

FIG. 2 is a flow chart 200 illustrating a process for generating, managing, and/or editing crowd management plans of a retail store. At block 202, a user 116 (e.g., a store manager or other authorized store associate) associated with a retail store 104(*a-c*) utilizes the interface 114 to communicate with the crowd planning tool module 108 in the central server 102 via the store server 112 and the network 106. In one embodiment, the user 116 operates a web browser on a computer terminal 114 to access the crowd planning tool module 108; however, in other embodiments, the user 116 may operate any other type of interface 114 to access the crowd planning tool module 108 via the central server 102 and the network 106.

According to one embodiment, at block 204, the user 116 logs into the crowd planning tool 108. For example, in one embodiment, the user 116 is required to enter a correct user name and password combination into the crowd planning tool module 108 to gain access to the crowd planning tool 108. In this way, only authorized store personnel can access the crowd planning tool 108. In other embodiments, the authorization of the user 116 to access the crowd planning tool 108 may be performed in any other known way.

Once authorization of the user 116 to access the crowd planning tool is confirmed, at block 206, the crowd planning tool module 108 generates a list of stores from which the crowd planning tool module 108 can receive crowd planning information. As shown in FIG. 1, the central server 102 (and hence the crowd planning tool module 108) is capable of communicating with, and receiving crowd planning information from, three stores 104-104*c*; however, in other embodiments, the central server 102 (and hence the crowd planning tool module 108) may be capable of communicating with, and receiving crowd planning information from, any number of different stores (i.e. store servers 112).

Figure 3:
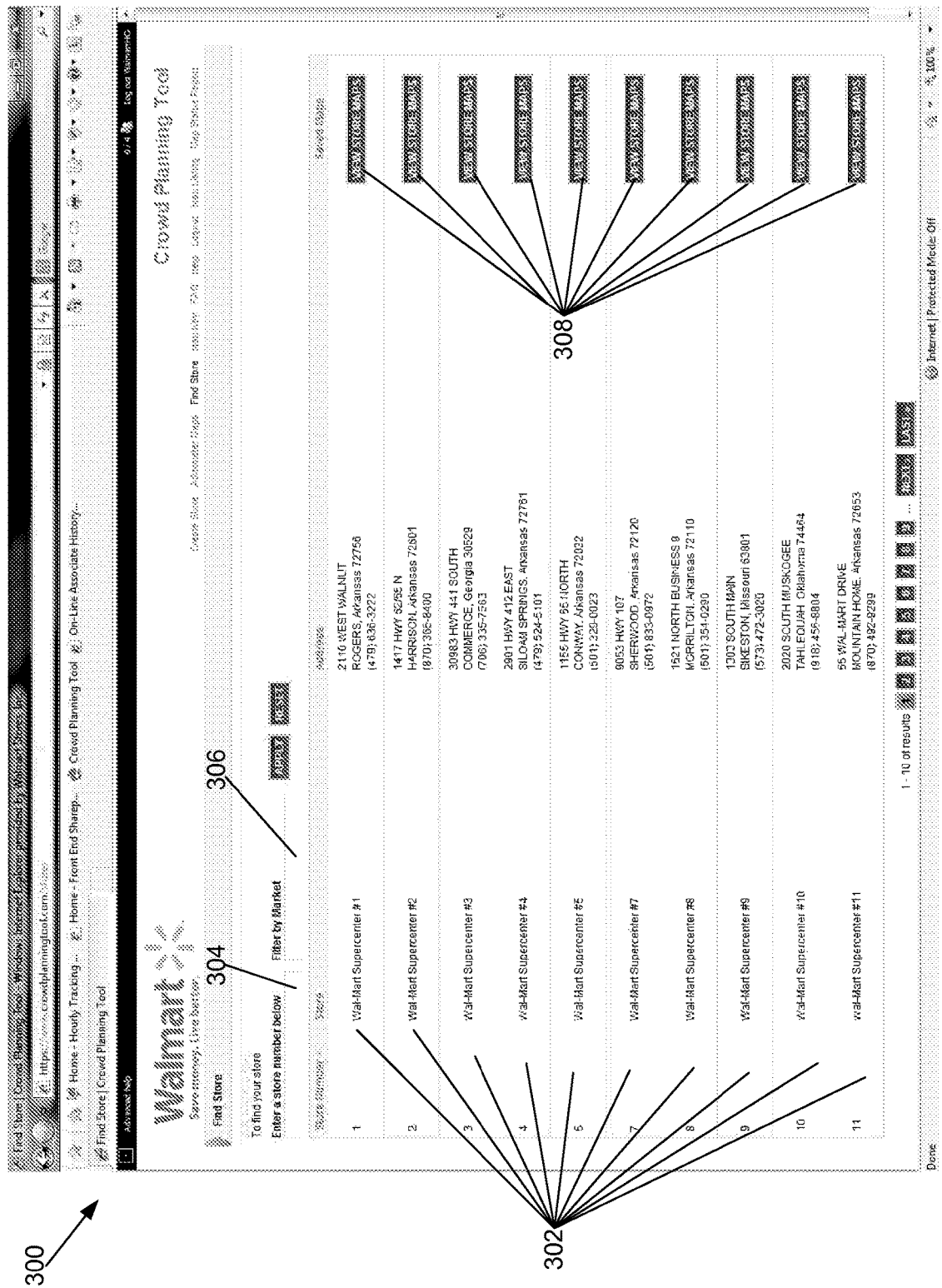
FIG. 3 is a screenshot view of a Graphical User Interface (GUI) including a list of retail stores in accordance with at least one embodiment described herein.

At block 208, the list of stores generated by the crowd planning tool module 108 is provided to the user 116 via the interface 114. For example, FIG. 3 is a screenshot view of a Graphical User Interface (GUI) 300 (including the list of stores 302) provided by the crowd planning tool module 108 to the interface 114 (via the network 106 and store server 112). If the number of stores in the list 302 is large, the user 116 may search for a specific store by utilizing a text box 304 to enter a specific identifying characteristic of the store (e.g., an identification number or location). The user 116 may also filter the list 302 of stores by utilizing a text box 306 to enter a filtering characteristic to be applied to the list 302 of stores (e.g., a specific market, location, store size, etc.). Upon applying the filtering characteristic to the list 302, only stores having the defined filtering characteristic will be included in the list 302.

According to one embodiment, the stores included in the list 302 are also limited by permission restrictions of the user 116. For example, in one embodiment where the user 116 is a store manager, the user 116 is restricted from viewing other stores crowd planning information and the list 302 only includes the store manager's own store. In another embodiment where the user 116 is a manager in charge of multiple stores in an area, the user 116 is restricted from viewing crowd planning information of stores outside of the manager's area and the list 302 only includes stores for which the manager is responsible. Also, in other embodiment where the user 116 is a senior level executive, the user 116 is not restricted at all and the list 302 includes all available stores. The permission restrictions placed on a user 116 may be defined in any appropriate way.

Once the user 116 identifies a desired store in the list 302 of the GUI 300, the user 116 may select the desired store by pressing the "View Store Map" button 308 corresponding to the desired store. Upon selecting the "View Store Map" button 308 of a desired store, at block 210, the crowd planning tool module 108 retrieves, from the database 110, crowd planning information related to the selected store. For example, the crowd planning tool module 108 may retrieve crowd planning maps related to the selected store that were previously generated and stored in the database 110. Such previously generated crowd planning maps may be retrieved for further editing or to simply be viewed. The crowd planning tool module 108 may also retrieve "new" store layout maps that do not include crowd planning information. Such "new" store layout maps may be retrieved to allow the user 116 to add crowd planning information to them and generate a new crowd management plan.

According to one embodiment, a "new" store layout map, not including crowd planning information, is generated by a map designer 126, provided to the central server 102, and stored in the database. In one embodiment, "new" store layout maps generated by the map designer 126 are provided to the central server via the network 106; however, in other embodiments, "new" store layout map generated by the map designer may be provided directly to the central server 102 and stored in the database 110.

Figure 4:
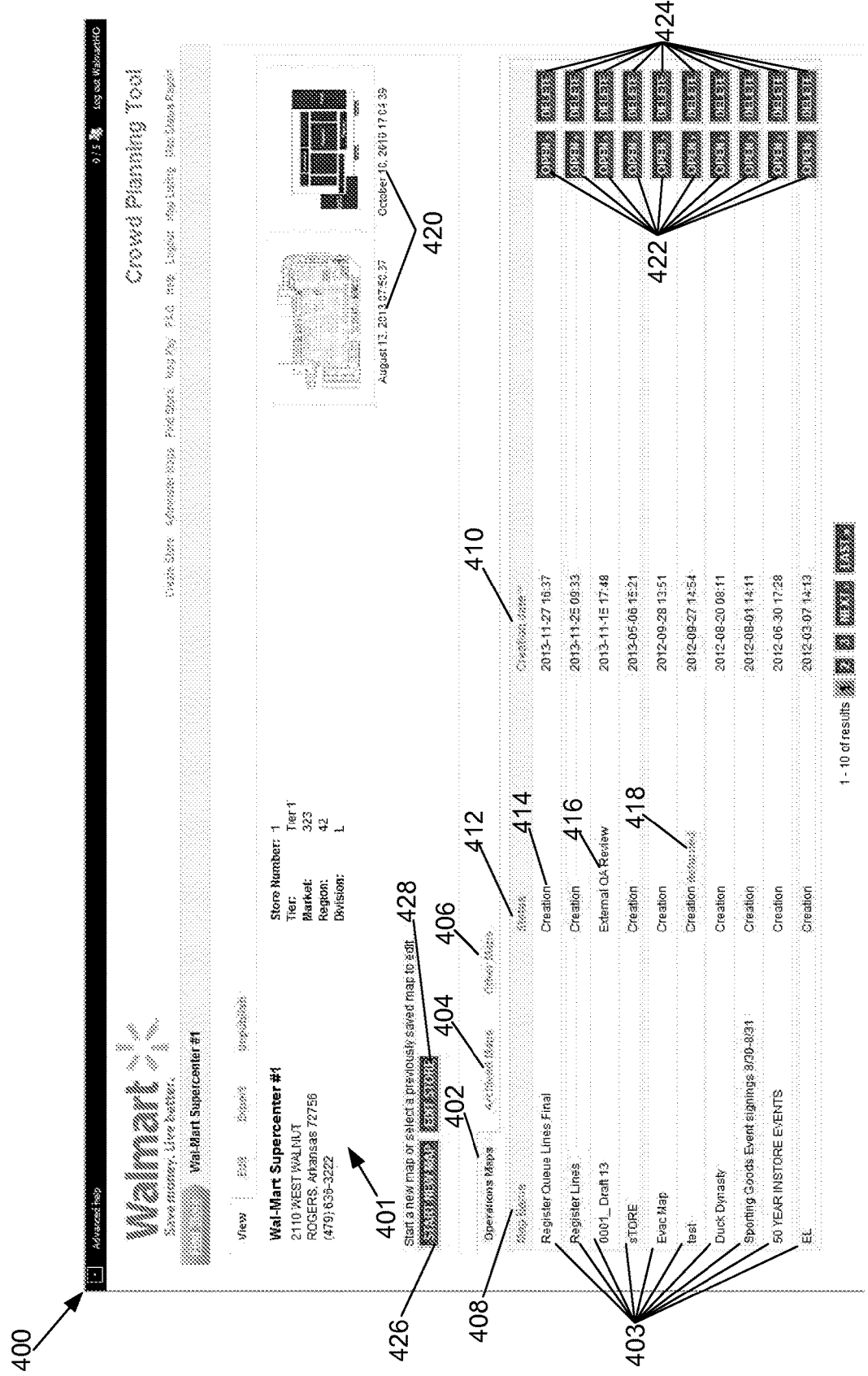
FIG. 4 is a screenshot view of a Graphical User Interface (GUI) including a list of crowd management maps associated with a retail store in accordance with at least one embodiment described herein.

At block 212, the previously generated crowd planning maps and the "new" store layout maps related to the selected store which are retrieved from the database 110 by the crowd planning tool module 108 are provided to the user 116 via the interface 114. For example, FIG. 4 is a screenshot view of a Graphical User Interface (GUI) 400 (including previously generated crowd planning and store layout information related to the selected store) provided by the crowd planning tool module 108 to the interface 114 (via the network 106 and store server 112).

The GUI 400 includes information 401 related to the selected store. The information 401 may include the store number, store location, store contact information, store region, store division, store market, store tier, and/or any other information related to the store. According to one embodiment, the store is assigned a tier level based on an assessed crowd management risk level. For example, if a store is assigned a high tier level, the risk for problems related to crowd management at the store is relatively high. If the store is assigned a low tier level, the risk for problems related to crowd management at the store is relatively low.

The GUI 400 also includes lists of previously generated operations crowd planning maps, archived crowd planning maps, and other previously generated crowd planning maps. A user 116 may operate the GUI 400 to display a desired group of maps by selecting a corresponding tab (e.g., the "Operations Maps" tab 402, the "Archived Maps" tab 404, or the "Other Maps" tab 406). For example, if the user 116 selects the "Operations Maps" tab 402, a list 403 of previously generated crowd planning maps related to the operations of the selected store is displayed. Such operations related crowd planning maps may include current register line maps, special event maps, holiday event maps, sale event maps, or any other type of map related to the operation of the selected store. Similarly, if the user 116 selects the "Archived Maps" tab 404, a list of archived crowd planning maps (i.e., older, previously utilized crowd planning maps) related to the selected store is displayed, and if the user 116 selects the "Other Maps" tab 406, a list of other miscellaneous crowd planning maps (e.g., evacuation maps, fire alarm maps, fire extinguisher placement maps, etc) related to the selected store is displayed.

An assigned name 408 of each map within the currently displayed list 403 is shown so that the user 116 may identify the different maps. The creation date 410 and status 412 of each map in the list 403 is also displayed. In one embodiment, the status 412 of each map indicates the stage of development of each map. For example, the status indicator of each map may indicate whether the map is still being created 414, is out for external review 416, or has been returned for correction 418. In other embodiments, the status indicator 412 of a map may include some other appropriate status information related to the map.

The GUI 400 also displays thumbnail images 420 of "new" store layout maps related to the selected store that do not include crowd planning information. Such thumbnail images 420 may allow a user to quickly determine whether a desired store has been selected correctly. In one embodiment, the thumbnail images 420 include a detailed layout map of the selected store and a more general block diagram of the selected store showing different departments; however, in other embodiments, any other store layout map may be displayed as thumbnail images 420.

At block 214, the user 116 may select to open a desired, previously generated, crowd planning map from the currently displayed list 403 of maps by pressing a corresponding "Open" button 422. The user 116 may also select to delete, from the list 403 and/or database 110, a desired, previously generated, crowd planning map from the currently displayed list 403 of maps by pressing a corresponding "Delete" button 424. The user 116 may also choose to open up a "new" store layout map that does not include previously defined crowd planning information by pressing the "Start New Map" button 426. The user 116 may also choose a different store (i.e., go back to the list of stores 302 shown in FIG. 3), by pressing the "Edit Store" Button.

Figure 5:
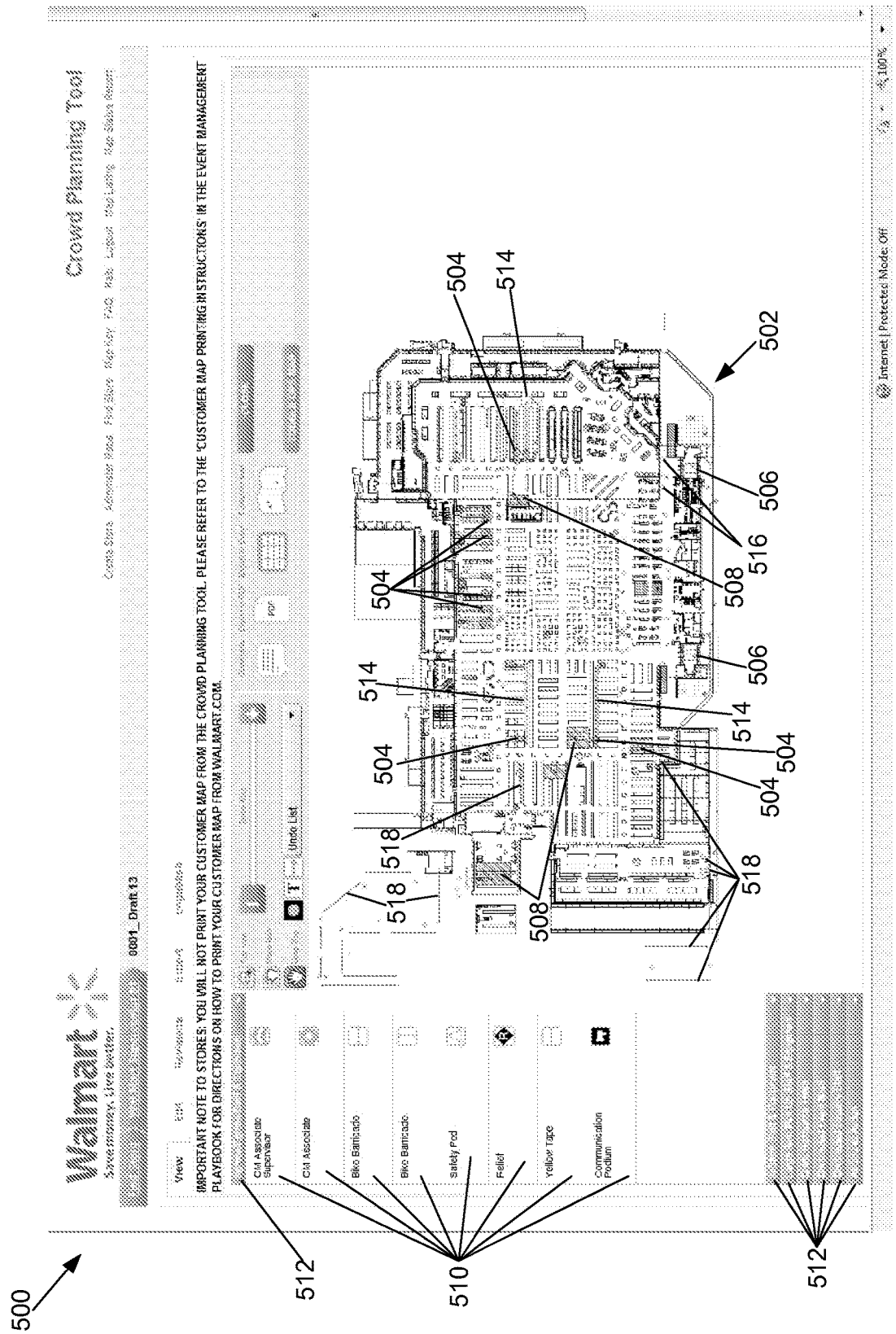
FIG. 5 is a screenshot view of a Graphical User Interface (GUI) including a detailed layout map associated with a retail store in accordance with at least one embodiment described herein.

Upon the user either selecting to open up a previously defined crowd planning map or selecting to open up a "new", unedited, store layout map, at block 216, the selected map is displayed to the user 116 via the interface 114. For example, FIG. 5 is a screenshot view of a Graphical User Interface (GUI) 500 (including the selected map) provided by the crowd planning tool module 108 to the interface 114 (via the network 106 and store server 112).

The GUI 500 includes a detailed layout map 502 of the selected store. If the user 116 selected a previously generated crowd planning map, then the detailed layout map 502 may already include crowd planning information. However, if the user 116 selected a "new" store layout map, then the detailed layout map 502 would not already include crowd planning information.

At block 218, the user 116 may operate the interface 114 to interact with the GUI 500 and edit the detailed layout map 502 with crowd planning information. For example, the detailed layout map 502 may be edited to include crowd "problem areas". Such "problem areas" may include areas around a highly desirable product 504 (i.e., a "hot product") (e.g., due to a sale or limited availability of the product), points of ingress or egress 506, areas that are closed to the public 508, or any other area that may cause crowd management issues.

The user 116 may also operate the interface 114 to interact with the GUI 500 to add crowd management devices 510 into the detailed layout map 502. Different crowd management devices 510 available for placement in the map 502 are listed in the GUI 500. Such crowd management devices 510 may be subdivided into appropriate headings 512. For example, as shown in FIG. 5, crowd management devices 510 associated with an "Ingress/Egress Staff & Equipment" subheading 512 are displayed. Additional subheadings 512 may include an "In-Store Staff & Equipment" subheading, a "Large Item Pick Up Staff & Equipment" subheading, a "Quick Response Team" subheading, a "Contracted Event Staff" subheading, a "Contracted Security Staff" subheading, and/or an "Additional Action" subheading. The GUI 500 may include any number and/or type of subheadings 112.

When selected by a user 116, each subheading 112 displays at least one crowd management device 510 that is related to the subheading 112 and that may be helpful in managing a crowd within the store. For example, when the "Ingress/Egress Staff & Equipment" subheading 512 is selected by the user 116, crowd management devices 510 such as an "Associate Supervisor", "Associate", "Bike Barricade", "Safety Pod", "Relief Station", "Yellow Tape", or "Communication Podium", are displayed for selection by the user 116. If the user selects a different subheading 112, a different group of crowd management devices 510 related to the selected subheading 112 would be displayed. Each available subheading 112 may be defined with any number of, or any type of, appropriate crowd management devices 510. Once a user 116 has selected a desired subheading 112, the user 116 may select one or more displayed crowd management devices 510 to place on the layout map 502 to manage a crowd within the store. For example, the user 116 may select an "Associate" 516 crowd management device to place at an ingress or egress location on the layout map 502 to direct a store associate to be in that location and assist customers coming and going from the store. The user 116 may also select the "Yellow Tape" 514 crowd management device to place at a desired location on the layout map 502 (e.g., near areas around highly desirable products (i.e., "hot items")) to direct yellow tape to be placed at the desired location to control the flow or direction of foot traffic in the desired location. Similarly, any of the available crowd management devices 510 may be selected by a user 116 and placed on the layout map 502 (e.g., near "problem areas") to direct activity which is intended to manage a crowd in the store. A user 116 may also add flow lines 518 into the layout map 502 to indicate the anticipated flow of foot traffic in a certain area.

According to one embodiment, the crowd management devices 510 that are displayed to the user 116 via the GUI 500 are determined based on a crowd management "Tier" status of the selected store. For example, each store may be assigned a crowd management "Tier" status. The "Tier" status of each store may be determined based on the likelihood that a crowd management issue may arise at the store. For example, in some embodiments, the crowd management "Tier" status of a store may be determined based on the number of crowd management incidents at the store over a period of time (e.g., over the previous year) or the volatility of the area at which the store is located. In other embodiments, the crowd management "Tier" status of each store may be determined differently.

The crowd management devices 510 that are displayed to the user 116 may depend on the crowd management "Tier" status of the store for which the user 116 is defining crowd management information. For example, if a store is identified as a "Tier 1" store because of the high likelihood of crowd management issues arising at the store, all available crowd management devices 510 may be displayed to the user 116 by the GUI 500. In addition, because of the high "Tier" status of the store, the GUI 500 may mandate that the user 116 utilize most of, if not all, of the available crowd management devices 510 in the layout map 502 prior to finalizing the map 502 (e.g., submitting the map for approval).

Alternatively, if the crowd management "Tier" status of a store is less than a "Tier 1" store, the GUI 500 may display a limited number of the crowd management devices 510 to the user 116. In one embodiment, the limited number of crowd management devices 510 includes a group of the most often used crowd management devices 510. In other embodiments, the limited number of crowd management devices 510 may be defined in any other way. In such an embodiment where the crowd management "Tier" status of a store is less than "Tier 1", the user 116 may be free to utilize as many, or as few, crowd management devices 510 as the user 116 deems necessary. The user 116 may also operate the GUI 500 to display all available crowd management devices 510.

Figure 6:
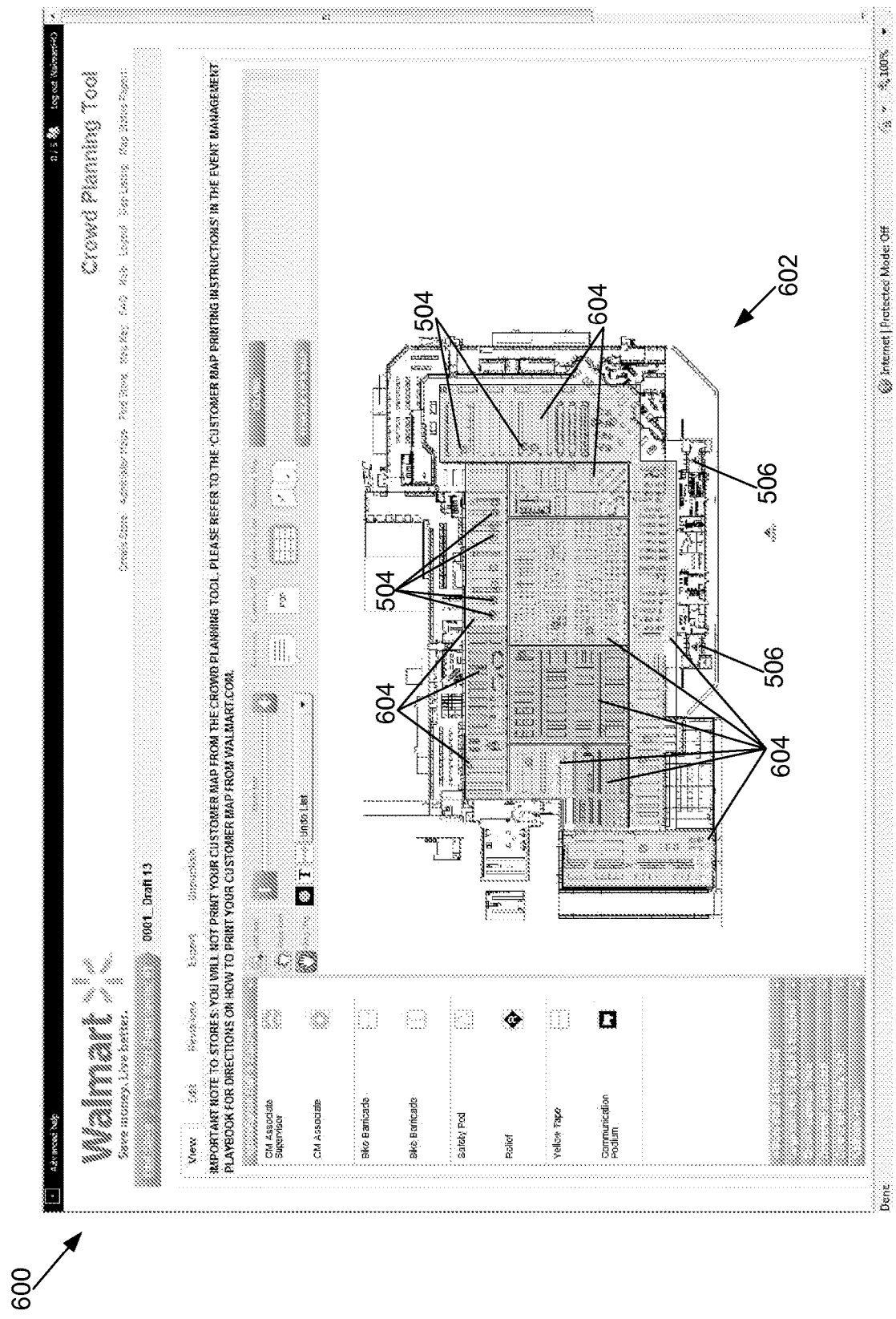
FIG. 6 is a screenshot view of a Graphical User Interface (GUI) including a department map associated with a retail store in accordance with at least one embodiment described herein.

According to one embodiment, at block 220, the user 116 may also convert the detailed layout map into a department based map. For example, FIG. 6 is a screenshot view of a Graphical User Interface (GUI) 600 (including the converted department map) provided by the crowd planning tool module 108 to the interface 114 (via the network 106 and store server 112).

The GUI 600 includes a converted department map 602 that is less detailed than the layout map 502 illustrated in FIG. 5. The department map 602 identifies the different departments 604 within the store (e.g., Lawn and Garden, Toys, Sporting Goods, Electronics, Apparel, Registers, Pharmacy, Food, etc) but does not include all of the detail from the layout map 502. The department map does still include indications of some of the "problem areas" identified by the user. For example, as shown in FIG. 6, the department map 602 may include the indications of areas around "hot items" 504 and of ingress and egress points 506. By generating a more simplified department map 602, a user 116 may be able to more quickly identify current "problem areas, additional "problem areas", and potential solutions.

At block 222, once the user 116 is finished editing the crowd management maps for a selected store 104(a-c), the created maps (e.g., the detailed layout map 502 and the department map 602) are stored in the database 110 of the central server 102. In one embodiment, the database 110 is a virtual cloud environment; however, in other embodiments, the crowd management maps may be stored differently.

According to one embodiment, once the recently created crowd management maps are stored in the database 100, an approval process of the maps begins. Once the approval process begins, the status indicator 412 in the GUI 400 (discussed above with regard to FIG. 4) will indicate that the map(s) are currently being reviewed 416.

According to one embodiment, the maps are first made available to a marketing manager at a marketing center 119. In one embodiment, a notice is transmitted to the marketing center 119 (e.g., via the network 106) that the marketing manager should log into the crowd planning tool module 108 (via the network 106) to review the new maps stored in the database 110. In another embodiment, the newly created maps are transmitted to the marketing center 119 (e.g., to an interface in the marketing center 119 operated by the marketing manager) from the database 110 for review. The marketing manager may approve of the maps, disapprove of the maps, or suggest changes to the maps. Signals indicating the approval, disapproval, or suggested edits of the maps are transmitted from the marketing center 119 back to the crowd planning tool module 108 via the network 106. If the marketing manager suggests changes to the maps, the status indicator 412 in the GUI 400 (discussed above with regard to FIG. 4) will indicate that a map has been returned 418 for the user 116 to make changes.

If the marketing manager approves of the maps, the maps are made available to an upper level manager (e.g., a regional level manager). In one embodiment, a notice is transmitted to the regional level center 120 (e.g., via the network 106) that the regional manager should log into the crowd planning tool module 108 (via the network 106) to review the new maps stored in the database 110. In another embodiment, the newly created maps are transmitted to the regional level center 120 (e.g., to an interface in the regional level center 120 operated by the regional level manager) from the database 110 for review. The regional manager may approve of the maps, disapprove of the maps, or suggest changes to the maps. Signals indicating the approval, disapproval, or suggested edits of the maps are transmitted from the regional center 120 to the crowd planning tool module 108 via the network 106. If the regional manager suggests changes to the maps, the status indicator 412 in the GUI 400 (discussed above with regard to FIG. 4) will indicate that a map has been returned 418 for the user 116 to make changes.

If the regional level manager approves of the maps, the maps are made available to an upper level manager (e.g., a divisional level manager). In one embodiment, a notice is transmitted to the divisional level center 122 (e.g., via the network 106) that the divisional manager should log into the crowd planning tool module 108 (via the network 106) to review the new maps stored in the database 110. In another embodiment, the newly created maps are transmitted to the divisional level center 122 (e.g., to an interface in the divisional level center 122 operated by the divisional manager) from the database 110 for review. The divisional manager may approve of the maps, disapprove of the maps, or suggest changes to the maps. Signals indicating the approval, disapproval, or suggested edits of the maps are transmitted from the divisional center 122 to the crowd planning tool module 108 via the network 106. If the divisional level manager suggests changes to the maps, the status indicator 412 in the GUI 400 (discussed above with regard to FIG. 4) will indicate that a map has been returned 418 for the user 116 to make changes.

As described above, the map approval process includes three levels of review (i.e., a marketing, regional, and divisional level); however, in other embodiments, maps may be reviewed by any number and/or type of reviewers. As also described above, each reviewer interacts with the crowd planning tool module 108 via the network 106; however, in other embodiments, a reviewer may interact directly with the crowd planning tool module 108 via an interface coupled directly to the central server 102 or coupled to the central server 102 via a Local Area Network (LAN).

According to at least one embodiment, once the divisional manager approves of the maps, at block 226, the newly approved crowd management maps are transmitted to the transformation module 118. In one embodiment, the transformation module 118 is in the central server 102 and receives the approved maps directly from the database 110; however in another embodiment, the transformation module 118 is located external from the central server 102 and receives the approved maps from the database 110 via the network 106.

The transformation module 118 generates a web-based consumer map based on the crowd management maps developed by the user 116 and transmits the web-based consumer map back to the central server 102 which is then stored in the database 110. For example, FIG. 7 is a screenshot view of a Graphical User Interface (GUI) 700 including the web-based consumer map 702 provided by the transformation module 118 to the central server 102 (e.g., via the network 106).

Figure 7:
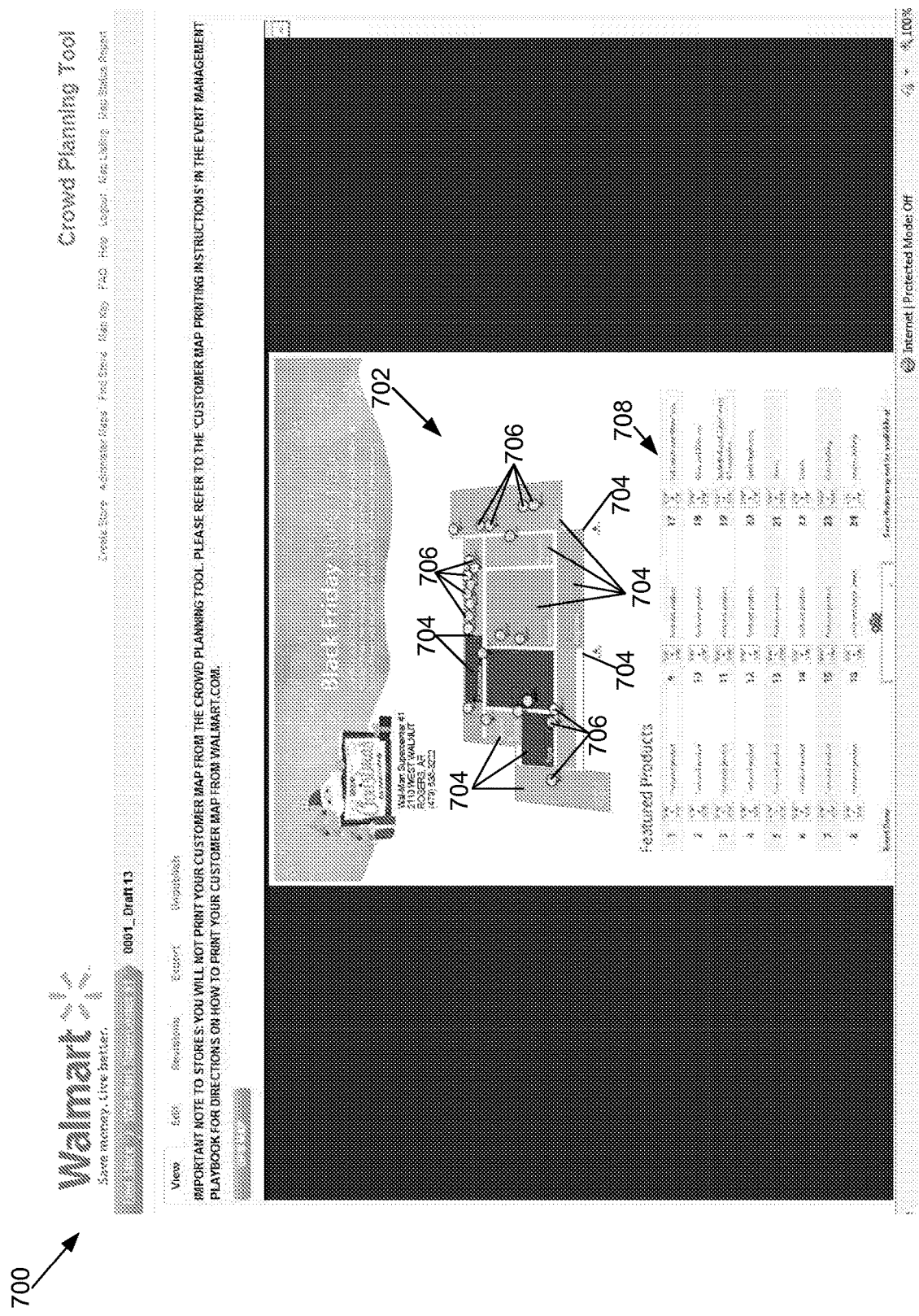
FIG. 7 is a screenshot view of a Graphical User Interface (GUI) including a web-based consumer map associated with a retail store in accordance with at least one embodiment described herein.

As seen in FIG. 7, the web-based consumer map 702 is intended for use by consumers and is customer friendly in that it is easier to read than the maps created by the user 116. The web-based consumer map 702 is a simplified block diagram of a selected store 704. The simplified block diagram 702 illustrates the different departments 704 of the store (e.g., as discussed above) and identifies the location of different "featured products" (e.g., the "hot items" identified earlier by the user 116) so that a user can quickly navigate the store. The consumer map 702 also includes a listing 708 of the featured products with corresponding identification numbers which are located on the map.

Once the web-based consumer map 702 is stored in the database 110, at block 228, a customer 124 accessing the website of the retailer, via the network 106, may also access the web-based consumer map 702 stored in the database 110.

Various embodiments according to the present invention may be implemented on one or more computer systems or other devices. A computer system may be a single computer that may include a minicomputer, a mainframe, a server, a personal computer, or combination thereof. The computer system may include any type of system capable of performing remote computing operations (e.g., cell phone, PDA, tablet, smart-phone, set-top box, or other system). A computer system used to run the operation may also include any combination of computer system types that cooperate to accomplish system-level tasks. Multiple computer systems may also be used to run the operation. The computer system also may include input or output devices, displays, or data storage units. It should be appreciated that any computer system or systems may be used, and the invention is not limited to any number, type, or configuration of computer systems.

These computer systems may be, for example, general-purpose computers such as those based on Intel Core or other type processors, or any other type of processor. It should be appreciated that one or more of any type computer system may be used to partially or fully automate operation of the described system according to various embodiments of the invention. Further, the system may be located on a single computer or may be distributed among a plurality of computers attached by a communications network.

Figure 8:
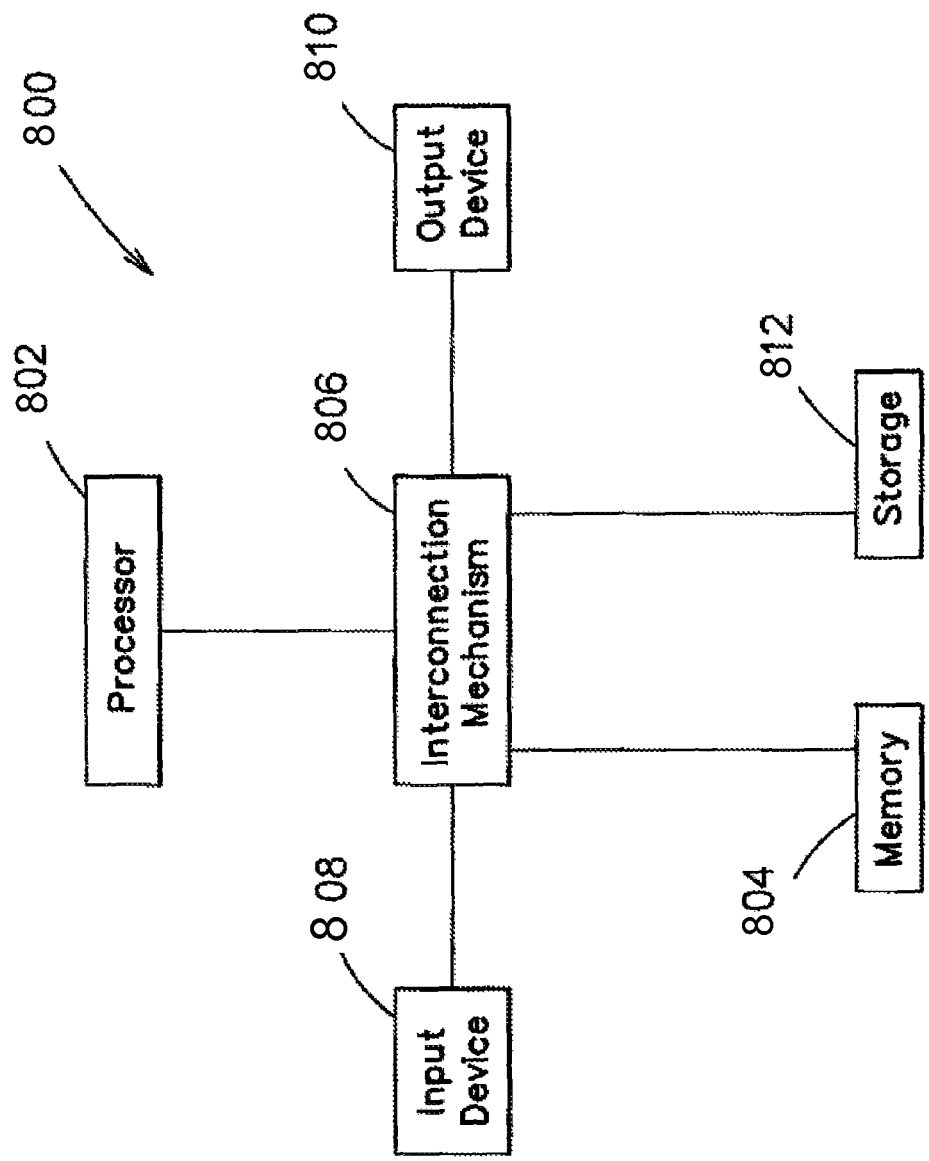
FIG. 8 is a block diagram of a general-purpose computer system upon which various embodiments of the invention may be implemented.

For example, various aspects of the invention may be implemented as specialized software executing in a general-purpose computer system 800 such as that shown in FIG. 8. The computer system 800 may include a processor 802 connected to one or more memory devices (i.e., data storage) 804, such as a disk drive, memory, or other device for storing data. Memory 804 is typically used for storing programs and data during operation of the computer system 800. Components of computer system 800 may be coupled by an interconnection mechanism 806, which may include one or more busses (e.g., between components that are integrated within a same machine) and/or a network (e.g., between components that reside on separate discrete machines). The interconnection mechanism 806 enables communications (e.g., data, instructions) to be exchanged between system components of system 800. Computer system 800 also includes one or more input devices 808, for example, a keyboard, mouse, trackball, microphone, touch screen, and one or more output devices 810, for example, a printing device, display screen, and/or speaker. In addition, computer system 800 may contain one or more interfaces (not shown) that connect computer system 800 to a communication network (in addition or as an alternative to the interconnection mechanism 806).

Figure 9:
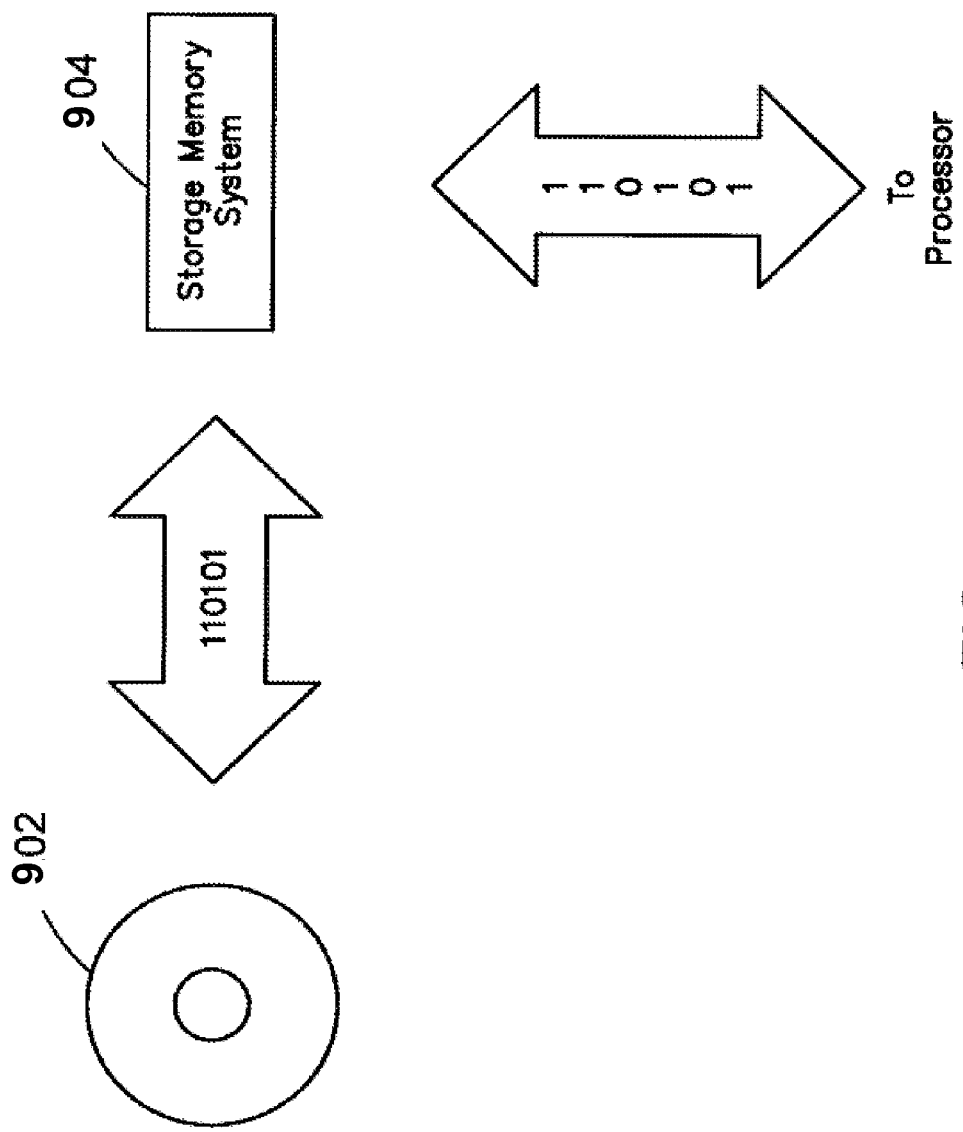
FIG. 9 is a block diagram of a computer data storage system with which various embodiments of the invention may be practiced.

The storage system 812, shown in greater detail in FIG. 9, typically includes a computer readable and writeable non-volatile recording medium 902 in which signals are stored that define a program to be executed by the processor or information stored on or in the medium 902 to be processed by the program. The medium may, for example, be a disk or flash memory. Typically, in operation, the processor causes data to be read from the nonvolatile recording medium 902 into another memory 904 that allows for faster access to the information by the processor than does the medium 902. This memory 904 is typically a volatile, random access memory such as a dynamic random access memory (DRAM) or static memory (SRAM). It may be located in storage system 812, as shown, or in memory system 804. The processor 802 generally manipulates the data within the integrated circuit memory 804, 904 and then copies the data to the medium 902 after processing is completed. A variety of mechanisms are known for managing data movement between the medium 902 and the integrated circuit memory element 804, 904, and the invention is not limited thereto. The invention is not limited to a particular memory system 804 or storage system 812.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 800 is shown by way of example as one type of computer system upon which various aspects of the invention may be practiced, it should be appreciated that aspects of the invention are not limited to being implemented on the computer system as shown in FIG. 8. Various aspects of the invention may be practiced on one or more computers having a different architecture or components that that shown in FIG. 8.

Computer system 800 may be a general-purpose computer system that is programmable using a high-level computer programming language. Computer system 800 may be also implemented using specially programmed, special purpose hardware. In computer system 800, processor 802 is typically a commercially available processor such as the well-known Core class processor available from the Intel Corporation. Many other processors are available. Such a processor usually executes an operating system which may be, for example, the Windows 7 or Windows 8 operating systems available from the Microsoft Corporation, MAC OS System X operating system or an iOS operating system available from Apple Computer, one of many Linux-based operating system distributions, for example, the Enterprise Linus operating system available from Red Hat Inc., or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol. Various embodiments of the present invention may be programmed using an object-oriented programming language, such as Java, Drupal, C++, or C # (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Various embodiments of the present invention may be implemented using a database management system such as Microsoft Access.

Also, it should be appreciated that one or more functions as described herein may be performed by one or more services distributed among one or more systems.

As described above, the web-based consumer map is stored in the central server database; however, in other embodiments, the web-based consumer map may be stored in a different location that is accessible by consumers and/or delivered directly to consumers.

As described above, the crowd planning tool module is located within the central server; however, in other embodiments, the crowd planning tool module may be located external from the central server and in communication with the central server.

As described above the system for generating crowd management plans is utilized in situations where there is planned increased activity in a store; however, in other embodiments, the system may also be utilized to generate crowd management plans for stores during different operating periods with more normal or reduced activity levels. The system may also be used to generate maps related to other concerns, such as fire extinguisher placement, rather than crowd management.

As described above, the system is utilized by a user 116 to generate a detailed layout map, a department map, and a web-based consumer map; however, in other embodiments, the user 116 may utilize the system to generate any one of these maps.

As also described above, a user interacts with the crowd planning tool module remotely via a store server and a WAN; however, in other embodiments, a user may interact with the crowd planning tool module locally via a LAN or via an interface coupled directly to the central server.

Accordingly, embodiments described herein provide a system and method for generating, editing, and/or managing crowd management plans of at least one retail store. The system and method allows a retailer to generate, edit, and/or manage multiple crowd management plans for any number of different periods of increased activity within a retail store. The system and method may also allow the retailer to pass any generated crowd management plans to a central location for approval. Additionally, the system and method may allow for the transformation of any generated crowd management plans into web-based maps which are more appropriate for viewing by a consumer. By utilizing such a system and method a retailer may be more easily, and more broadly, prepared for any number of different periods of increased activity. Not only may such preparation prevent any undesired confusion and/or unsafe conditions, but it may also help the retailer comply with any regulations related to crowd management by a retailer.

Further, it is appreciated that other types of information regarding retail store layout may be maintained and distributed, such as information relating to fire safety and emergency preparedness, store design and layout, capacity planning, among others. Further, it should be appreciated that some or all of the information may be shared with one or more third parties through a variety of interfaces.

Having thus described several aspects of at least one embodiment of this invention, it is to be appreciated various alterations, modifications, and improvements will readily occur to those skilled in the art. Such alterations, modifica- tions, and improvements are intended to be part of this disclosure, and are intended to be within the spirit and scope of the invention. Accordingly, the foregoing description and drawings are by way of example only.

What is claimed is:

1. A crowd management planning system for performing crowd planning for a group of retail stores, the system comprising:
a plurality of remote store servers configured to be coupled to a network, each of the group of retail stores having a remote store server of the plurality of remote store servers;
a central server, the central server comprising:
an interface configured to be coupled to the network;
at least one computer processor and a memory;
a database; and
a crowd planning module stored as computer program code in the memory that is executed by the at least one computer processor, and accessible by the interface and the database and configured to communicate with each one of the plurality of remote store servers, wherein the crowd planning module is further configured and executable to provide a crowd planning tool to at least one of the plurality of remote store servers coupled to the central server and the network, receive crowd planning information from the at least one of the plurality of remote store servers based on users' interactions with the crowd planning tool, store the received crowd planning information in the database, and display at a user computer at least one graphically depicted store layout map and at least one crowd planning map pertaining to a selected store having the at least one of the plurality of remote store servers and produced from the crowd planning information retrieved from the at least one of the plurality of remote store servers, the system further comprising:
a transformation module stored in a memory and executed by a computer processor that generates a web-based consumer map transformed from the crowd planning information associated with the at least one graphically depicted store layout map, wherein the crowd management planning system further comprises a graphical user interface (GUI) constructed and arranged to display the graphically depicted store layout map including a detailed store layout map of the selected store, the detailed store layout map configured for a dynamic addition of a plurality of crowd management devices arranged and displayed at the GUI, a number of the crowd management devices for display determined by a crowd management tier status of the selected store as provided by the at least one remote store server to the crowd planning module executed in the central server, the GUI displaying and controlling a number of displayed crowd management devices for selection according to the crowd management tier status of the selected store, the crowd management tier status based on assessed crowd management risk level at the selected store, the GUI further constructed and arranged to display the at least one store layout map as at least one of a new store layout map for generating a new crowd management plan or a previously generated crowd planning map, the GUI further constructed and arranged to display a crowd problem area on the at least one store layout map, wherein the displayed crowd management devices displayed according to the crowd management tier status are located near the displayed crowd problem area to direct activity intended to manage a crowd in the store, the GUI further displaying flow lines in the at least one store layout map to indicate an anticipated flow of foot traffic relative to the crowd problem area.

2. The crowd management planning system of claim 1, further comprising a store interface coupled to the at least one of the plurality of remote store servers, wherein the crowd planning tool provided to the at least one of the plurality of remote store servers includes the Graphical User Interface (GUI) displayed on the store interface.

3. The crowd management planning system of claim 2, wherein the crowd planning tool is further configured to provide the at least one graphically depicted store layout map to the GUI displayed on the store interface.

4. The crowd management planning system of claim 3, wherein the at least one store layout map is one of a new store layout map and a previously generated crowd planning map stored in the database.

5. The crowd management planning system of claim 3, wherein the crowd planning information received by the crowd planning module includes crowd planning information associated with the at least one store layout map and input by a user through interactions with the GUI displayed on the store interface.

6. The crowd management planning system of claim 5, wherein the crowd planning information associated with the at least one store layout map includes at least one of a crowd problem area and a crowd management device.

7. The crowd management planning system of claim 5, wherein the crowd planning module is further configured to generate a department level map based on the crowd planning information associated with the at least one store layout map.

8. The crowd management planning system of claim 5, further comprising at least one approval center, wherein the crowd planning module is further configured to transmit the crowd planning information associated with the at least one store layout map to the at least one approval center, and receive an approval decision related to the crowd planning information associated with the at least one store layout map from the at least one approval center.

9. The crowd management planning system of claim 5, wherein the crowd planning module is further configured to transmit the crowd planning information associated with the at least one store layout map to the transformation module, and to receive, from the transformation module, a consumer map generated by the transformation module based on the crowd planning information associated with the at least one store layout map.

10. A method for managing crowd planning information from a plurality of stores in a retail environment, the method comprising:
providing, from a crowd planning module stored as computer program code in the memory that is executed by the at least one computer processor in a central server, a crowd planning tool to at least one remote store server in at least one of the plurality of stores in the retail environment, each of the plurality of stores having a remote store server;
displaying, at an interface of a user computer in the at least one of the plurality of stores, the crowd planning tool to a user;

receiving, at the crowd planning module, crowd planning information from the at least one remote store server based on user interaction with the crowd planning tool;

storing the crowd planning information in a database of the central server;

further displaying at the interface at a user computer at least one graphically depicted store layout map and at least one crowd planning map pertaining to a selected store and produced from the crowd planning information of the at least one remote store server; and providing a transformation module stored in a memory and executed by a computer processor that generates a web-based consumer map transformed from the crowd planning information associated with the at least one graphically depicted store layout map wherein the graphically depicted store layout map includes a detailed store layout map of the selected store, the detailed store layout map configured for an addition of a plurality of crowd management devices arranged and displayed at the user computer, the interface displaying and controlling a number of displayed crowd management devices determined by a crowd management tier status of the selected store as provided by the at least one remote store server to the crowd planning module executed in the central server, wherein the crowd management tier status is based on an assessed crowd management risk level at the selected store.

11. The method of claim 10, wherein displaying the crowd planning tool includes displaying the at least one graphically depicted store layout map associated with the at least one of the plurality of stores.

12. The method of claim 11, wherein displaying the at least one store layout map includes displaying at least one of a new store layout map and a previously generated crowd planning map stored in the database.

13. The method of claim 11, wherein receiving crowd planning information includes receiving crowd planning information associated with the at least one store layout map and input by the user to the crowd planning tool.

14. The method of claim 13, wherein receiving crowd planning information associated with the at least one store layout map includes receiving crowd planning information related to at least one of a crowd problem area and a crowd management device.

15. The method of claim 11, further comprising generating, with the crowd planning module, a department level map based on the crowd planning information associated with the at least one store layout map.

16. The method of claim 11, further comprising:
transmitting, by the crowd planning module, the crowd planning information associated with the at least one store layout map to at least one approval center; and
receiving an approval decision from the at least one approval center.

17. The method of claim 11, further comprising:
transmitting, by the crowd planning module, the crowd planning information associated with the at least one store layout map to a transformation module; and
receiving, by the crowd planning module from the transformation module, a consumer map generated by the transformation module based on the crowd planning information associated with the at least one store layout map.

18. A non-transitory computer-readable medium encoded with instructions for execution on a distributed computer system within a retail environment, the instructions when executed, performing a method comprising acts of:

providing, from a crowd planning module stored as computer program code in the memory that is executed by the at least one computer processor in a central server, a crowd planning tool to at least one remote store server in at least one of a plurality of stores in the retail environment, the crowd planning module for performing crowd planning for the plurality of stores, each of the group of stores having a remote store server of the plurality of remote store servers, the at least one remote store server coupled to the central server;

displaying, at an interface of a user computer in the at least one of the plurality of stores, the crowd planning tool to a user;

receiving, at the crowd planning module, crowd planning information from the at least one remote store server based on user interaction with the crowd planning tool;

storing the crowd planning information in a database of the central server;

further displaying at the interface at a user computer at least one graphically depicted store layout map and at least one crowd planning map pertaining to a selected store having the at least one of the plurality of remote store servers and produced from the crowd planning information of the at least one remote store server; and providing a transformation module stored in a memory and executed by a computer processor that generates a web-based consumer map transformed from the crowd planning information associated with the at least one graphically depicted store layout map, wherein the graphically depicted store layout map includes a detailed store layout map of the selected store, the detailed store layout map configured for an addition of a plurality of crowd management devices arranged and displayed at the user computer, a number of the crowd management devices for display determined by a crowd management tier status of the selected store as provided by the at least one remote store server to the crowd planning module executed in the central server, wherein the crowd management tier status is based on an assessed crowd management risk level at the selected store.

19. The non-transitory computer-readable medium of claim 18, wherein displaying the crowd planning tool includes displaying the at least one graphically depicted store layout map associated with the at least one of the plurality of stores.

20. The non-transitory computer-readable medium of claim 19, wherein receiving crowd planning information includes receiving crowd planning information associated with the at least one store layout map and input by the user to the crowd planning tool.

* * * * *